(12) United States Patent
Buchanan, Jr.

(10) Patent No.: US 7,225,498 B2
(45) Date of Patent: *Jun. 5, 2007

(54) WINDSHIELD WIPER SYSTEM WITH TUBULAR MEMBER PLUS INTERNAL HOSE

(75) Inventor: Harry C. Buchanan, Jr., Dayton, OH (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 549 days.

This patent is subject to a terminal disclaimer.

(21) Appl. No.: 10/281,489

(22) Filed: Oct. 28, 2002

(65) Prior Publication Data

US 2004/0078916 A1    Apr. 29, 2004

(51) Int. Cl.
*B60S 1/32* (2006.01)
*B60S 1/34* (2006.01)

(52) U.S. Cl. .................. 15/250.351; 15/250.04

(58) Field of Classification Search ....... 15/250.351, 15/250.352, 250.04, 250.201, 250.21, 250.23; 239/284.1, 284.2
See application file for complete search history.

(56) References Cited

U.S. PATENT DOCUMENTS

| | | | |
|---|---|---|---|
| 4,318,201 A | 3/1982 | Rogers et al. | |
| 4,347,641 A | 9/1982 | Kohler et al. | |
| 4,736,487 A | 4/1988 | Epple et al. | |
| 4,864,678 A | 9/1989 | Stevens | |
| 5,442,834 A | 8/1995 | Perry | |
| 5,894,626 A | 4/1999 | Edele et al. | |
| 6,148,470 A | 11/2000 | Buchanan, Jr. et al. | |
| 6,212,730 B1 | 4/2001 | Kalbas et al. | |
| 6,253,411 B1 | 7/2001 | Aichele et al. | |
| 6,381,800 B1 | 5/2002 | Buchanan, Jr. et al. | |
| 6,505,377 B1 | 1/2003 | Merkel et al. | |
| 6,833,682 B2 * | 12/2004 | Buchanan, Jr. | 318/443 |
| 2002/0152573 A1 | 10/2002 | Tsukui et al. | |
| 2004/0078917 A1 * | 4/2004 | Buchanan, Jr. | 15/250.351 |
| 2004/0078918 A1 * | 4/2004 | Buchanan, Jr. | 15/250.351 |
| 2004/0078919 A1 * | 4/2004 | Buchanan, Jr. | 15/250.351 |
| 2005/0011034 A1 * | 1/2005 | Buchanan, Jr. | 15/250.351 |

FOREIGN PATENT DOCUMENTS

| | | |
|---|---|---|
| DE | 2319062 A | 10/1974 |
| DE | 3142716 A | 5/1983 |

(Continued)

OTHER PUBLICATIONS

Seely, Fred B. "Elastic and Inelastic Buckling of Columns." Advanced Mechanics of Materials. Second Edition. New York: John Wiley & Sons, Inc., 1959.

(Continued)

*Primary Examiner*—Gary K. Graham
(74) *Attorney, Agent, or Firm*—Jacox, Meckstroth & Jenkins

(57) ABSTRACT

This invention relates to a windshield wiper system and method which utilizes a flexible drive arm for withstanding bending loads applied to a wiper. The drive arm may be made of a pull-molded composite material having a relatively low modulus of elasticity and a relatively high elongation factor. The flexible arm twists in the presence of a bending load and undergoes rapidly progressing elastic buckling when the bending load exceeds a predetermined amount.

22 Claims, 7 Drawing Sheets

FOREIGN PATENT DOCUMENTS

| | | |
|---|---|---|
| DE | 3611098 | 9/1986 |
| DE | 3525739 A | 1/1987 |
| DE | 3936597 | 5/1991 |
| DE | 4409479 A1 | 10/1994 |
| DE | 19700180 | 7/1998 |
| DE | 19747857 | 5/1999 |
| EP | 525850 A1 | 2/1993 |
| FR | 2566726 A | 1/1986 |
| FR | 2838090 | 10/2003 |

OTHER PUBLICATIONS

Penrod, James P., Yaomin Dong, and H. Charles Buchanan. "A Novel Use of a Composite Material to Limit the Loads in Windshield Wiper Systems." Society of Automotive Engineers, 2001.

* cited by examiner

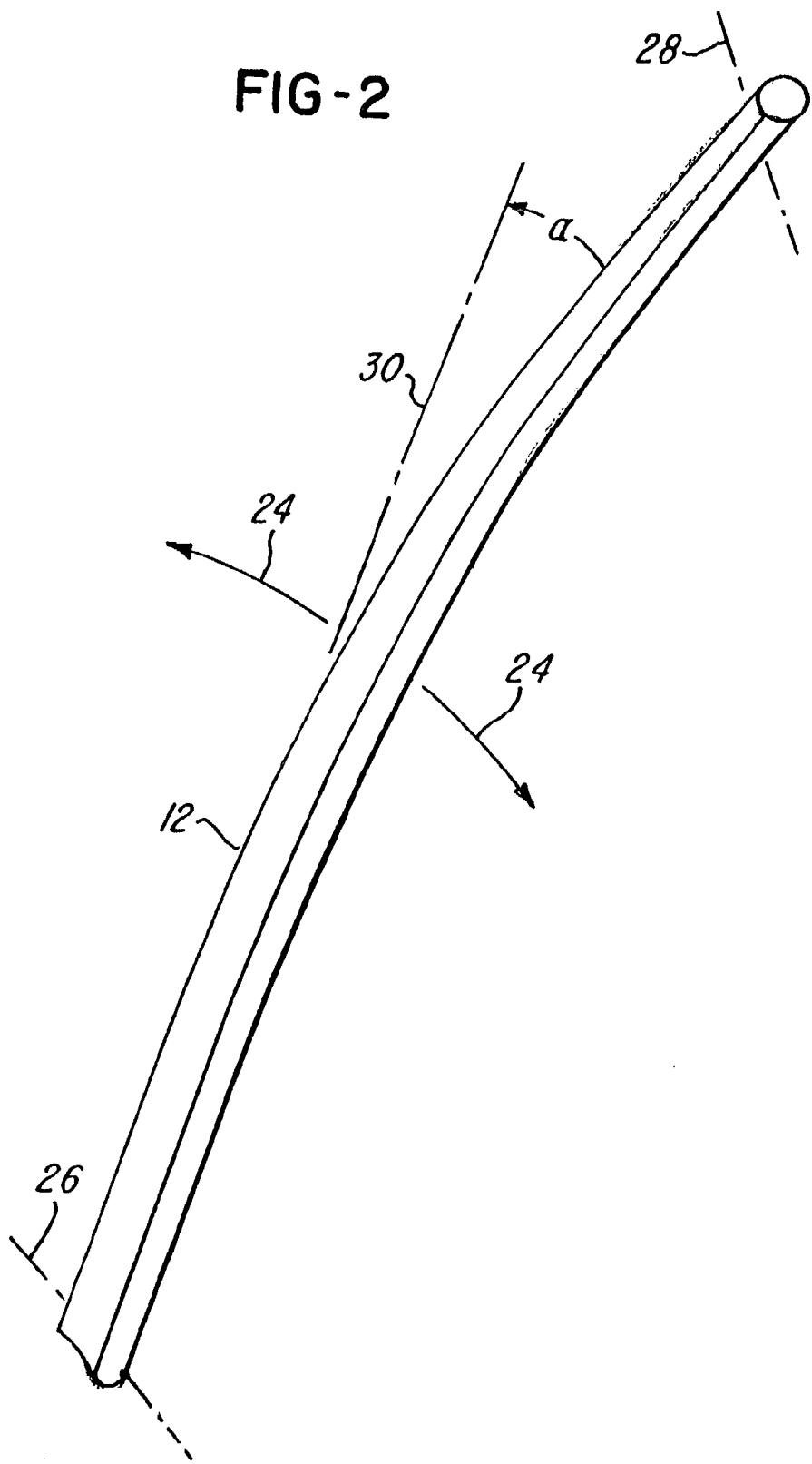

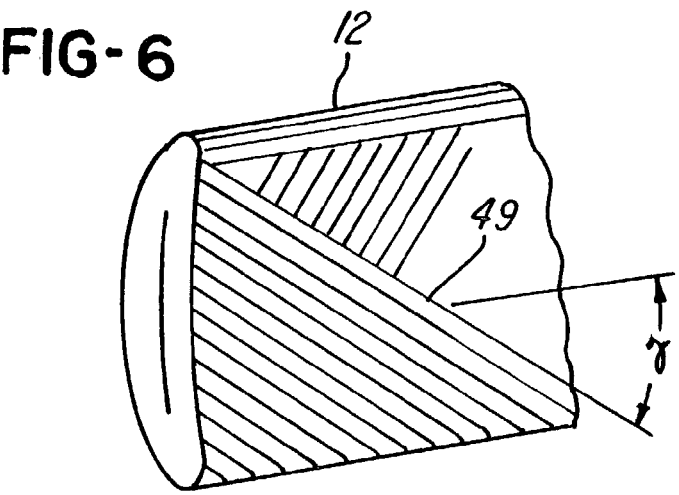
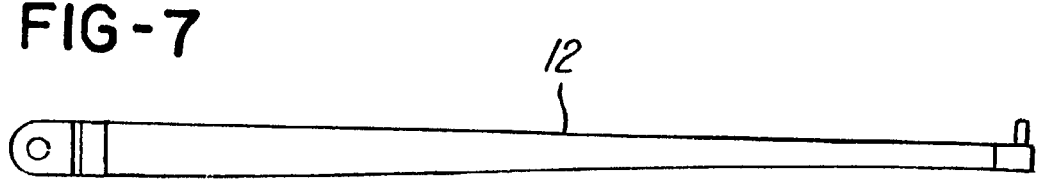
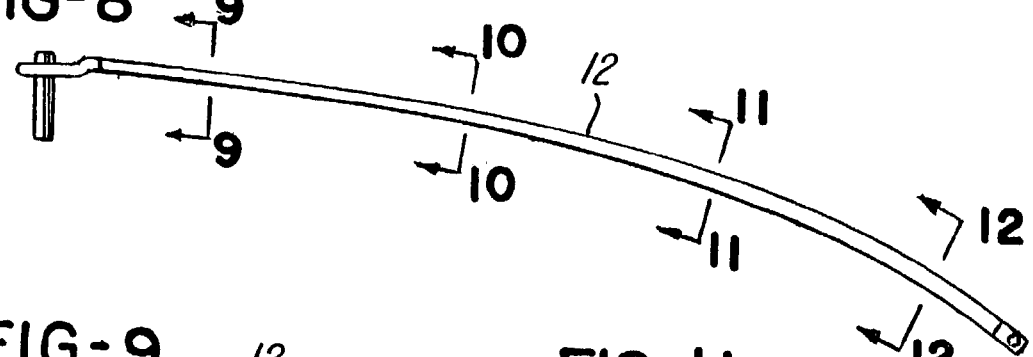
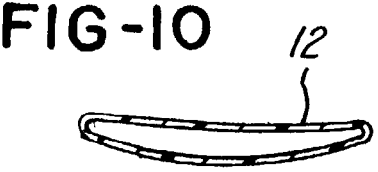
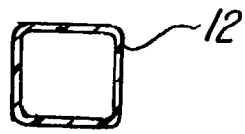

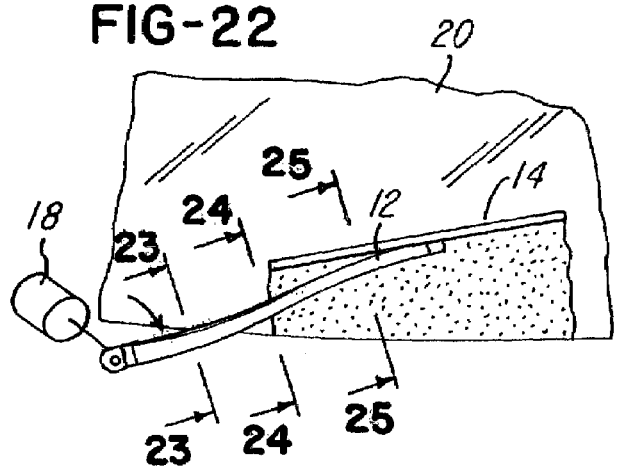
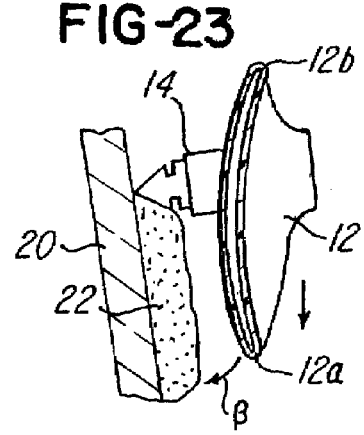
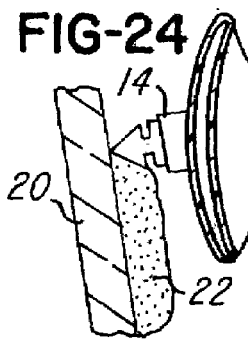
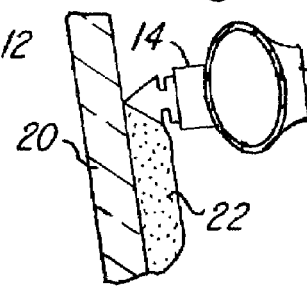
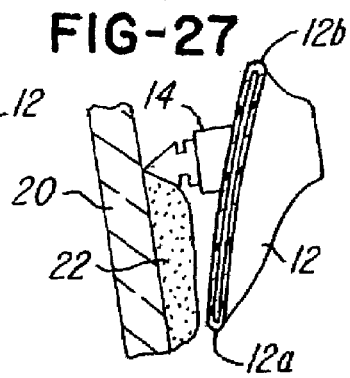
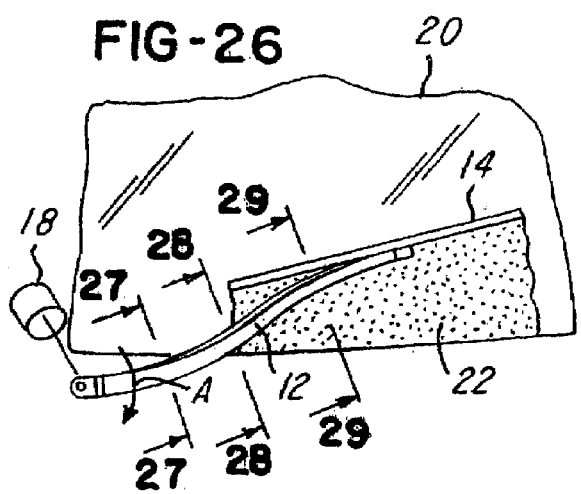
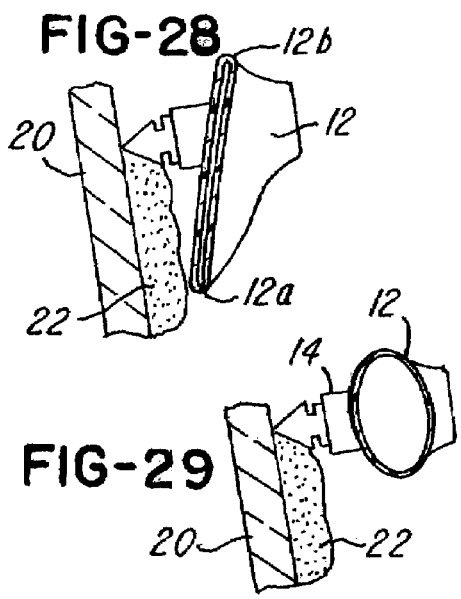

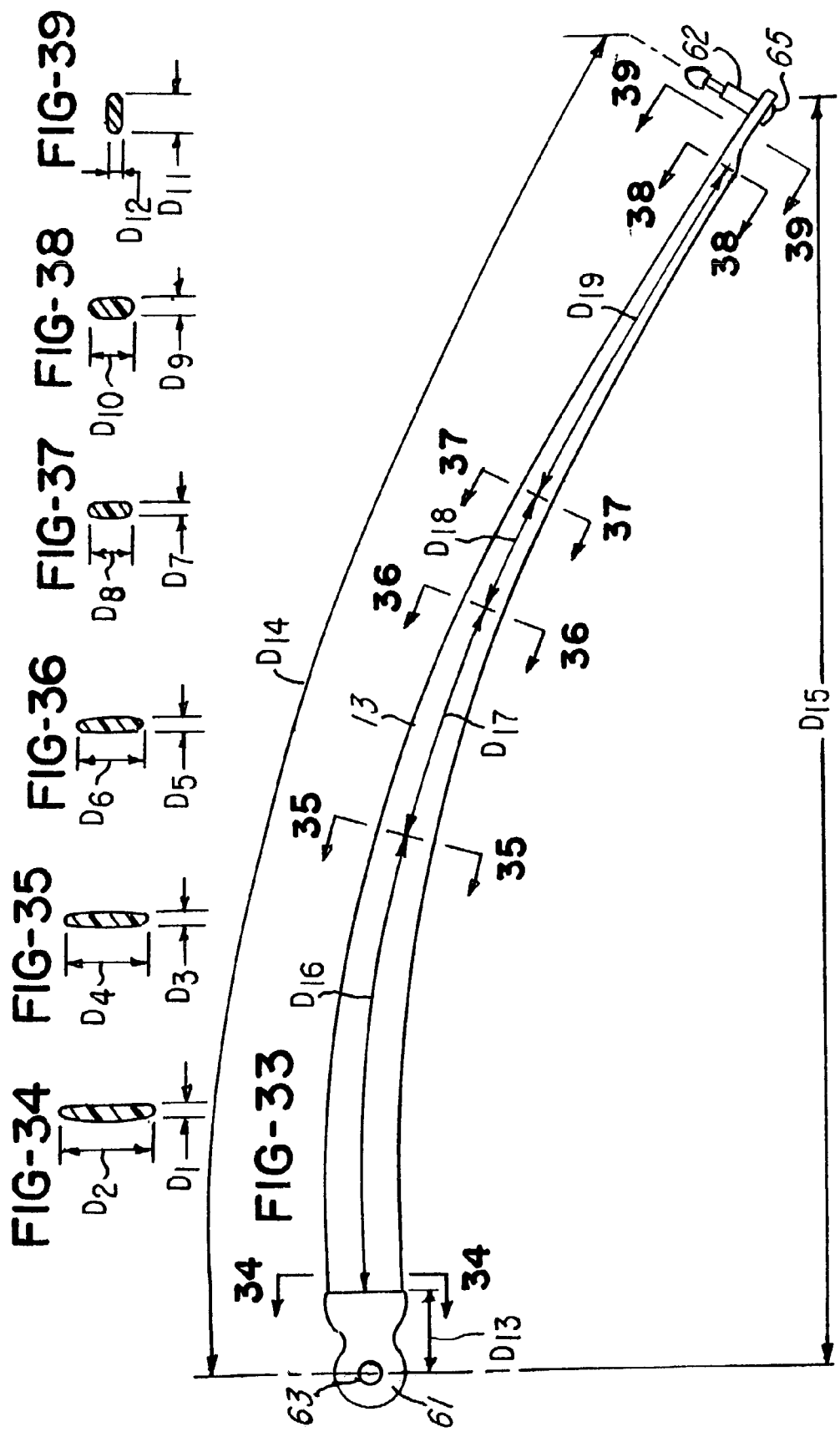

WINDSHIELD WIPER SYSTEM WITH TUBULAR MEMBER PLUS INTERNAL HOSE

BACKGROUND OF THE INVENTION

This invention relates to a windshield wiper system and, more particularly, to a windshield wiper system which utilizes a reciprocating, flexible arm comprising a tubular member and internal hose for driving a windshield wiper.

An example of a prior art windshield wiper drive link and system is shown in Buchanan et al., U.S. Pat. No. 6,148,470, which is incorporated herein by reference and made a part hereof. A windshield wiper system, as taught therein, is particularly useful for driving in snow or in mud, under conditions wherein an accumulation of foreign material may cause a sudden blockage of the wiper block. When this happens, the windshield wiper motor may generate a momentarily large driving torque in an attempt to overcome the blockage. That in turn may cause permanent damage to one or more components of the wiper system.

A flexible arm, as taught in Buchanan et al., reduces the risk of such damage by constructing the wiper drive arm from a material which tolerates compression loads up to a predetermined limit. Below that limit, known as the critical buckling load limit, the drive arm simply compresses by an amount proportional to the force of the load. However, upon reaching the critical buckling load limit, the arm gives way by pronounced elastic buckling. The buckling effectively prevents any further increase in the load being applied to wiper system components, and does so without permanent injury to the drive arm. Once the blockage has been removed, manually or otherwise, the flexible arm simply pops back into its original configuration.

As further taught in Buchanan et. al. U.S. Pat. No. 6,148,470, the flexible drive arm may be interposed between a drive motor and a pair of drive plates. The drive plates in turn apply drive torques cooperatively to a pair of wiper blades. The flexible drive arm preferably is made from a composite material of a type described in Table I of the patent. Four specific materials are taught, including a molded glass laminate, a molded epoxy resin, and two pull-molded polyesters having oriented glass fibers.

As further disclosed in Buchanan et al, the flexible drive arm may be generally elongated and generally rectangular in cross-section. The patent teaches that the flexible drive arm could have other cross-sectional geometries, such as elliptical or circular, and in one described configuration could have a length of at least about 250 mm. Notches could be fabricated in the flexible drive arm in order to adjust the bending stress at which elastic buckling occurs. The patent observes that a suitable flexible drive arm should have a design strength such that buckling is not expected to occur in the face of a compression load less than about 30 percent greater than the normally expected maximum running load for a comparably sized steel or rigid link that does not flex.

The prior art also includes a windshield wiper for an aircraft, as shown, for example in Rogers et. al (U.S. Pat. No. 4,318,201). That patent teaches a flexible drive arm for a windshield wiper wherein the cross-section varies from end to end in order to control the onset of elastic buckling. The Rogers patent also discloses the use of a glass fiber composite for construction of a flexible drive arm for a windshield wiper.

SUMMARY OF THE INVENTION

This invention improves the performance of a windshield wiper by providing it with a flexible drive arm supported by a hollow tube extending from a motor to a wiper arm. The tube preferably has a normally unstressed sideward curvature for relaxation along a windshield when the wiper axis rests on a curved portion thereof. The cross-section of the hollow tube has an off-center shear center. As the wiper axis moves to a flat portion of the windshield, the contact of the wiper against the windshield generates a sidewardly directed bending (unbending) force which stresses and straightens out the drive arm along a cross-sectional width. The straightening of the drive arm sets up internal bending stresses which flattens the hollow tube thereby progressively decreasing the moment of inertia about the longitudinal axis. Transverse blocking results in elastic buckling when the sidewardly applied bending force reaches a predetermined level. That in turn relieves the stress on the windshield drive motor and wiper components when the wiper system or arm becomes blocked.

In one aspect, this invention comprises a drive arm for a windshield wiper comprising a tubular member having a preselected cross-section and an internal cavity extending along a longitudinal axis, with a curvature extending laterally from the longitudinal axis, the internal cavity defining a passageway through which washer fluid may pass, the tubular member defining a wiper axis for connection of a wiper thereto and also defining a motor axis for connection of a drive motor thereto and the tubular member generally bending about the longitudinal axis when a bending force is applied thereto.

In another aspect, this invention comprises a windshield wiper system comprising a drive motor, a drive arm coupled to the drive motor and a wiper blade also coupled to the drive arm for wiping a windshield when the drive motor is energized; the drive arm being made of a composite material and being generally curved in cross-section and comprising a passageway through which washer fluid may pass.

Other objects and advantages of the invention will be apparent from the following description, the accompanying drawings and the appended claims.

BRIEF DESCRIPTION OF THE DRAWINGS

FIG. 2 is an isometric drawing of a flexible drive arm;

FIG. 6 is a schematic illustration of braiding of pull-molded composite material about the surface of a flexible drive arm;

FIG. 7 is a plan view of a drive arm in accordance with an embodiment of the invention;

FIG. 8 is a side view of the drive arm shown in FIG. 7, illustrating the curvature of the side arm;

FIG. 9 is a cross-sectional view taken along the line 9—9 in FIG. 8;

FIG. 10 is a cross-sectional view taken along the line 10—10 in FIG. 8;

FIG. 11 is a cross-sectional view taken along the line 11—11 in FIG. 8;

FIG. 12 is a cross-sectional view taken along the line 12—12 in FIG. 8;

FIG. 22 is another view of the wiper arm shown in FIG. 18 as a motor continues to drive the arm;

FIG. 23 is a cross-sectional view taken along the line 23—23 in FIG. 22;

FIG. 24 is a cross-sectional view taken along the line 24—24 in FIG. 22;

FIG. 25 is a cross-sectional view taken along the line 25—25 in FIG. 22;

FIG. 26 is another view of the wiper arm illustrated in FIG. 22;

FIG. 27 is a cross-sectional view taken along the line 27—27 in FIG. 26;

FIG. 28 is a cross-sectional view taken along the line 28—28 in FIG. 26;

FIG. 29 is a cross-sectional view taken along the line 29—29 in FIG. 26;

FIG. 33 is a view of another embodiment of the invention;

FIG. 34 is a cross-sectional view taken along the line 34—34 in FIG. 33;

FIG. 35 is a cross-sectional view taken along the line 35—35 in FIG. 33;

FIG. 36 is a cross-sectional view taken along the line 36—36 in FIG. 33;

FIG. 37 is a cross-sectional view taken along the line 37—37 in FIG. 33;

FIG. 38 is a cross-sectional view taken along the line 38—38 in FIG. 33; and

FIG. 39 is a cross-sectional view taken along the line 39—39 in FIG. 33.

DESCRIPTION OF THE PREFERRED EMBODIMENT

Figure 1:
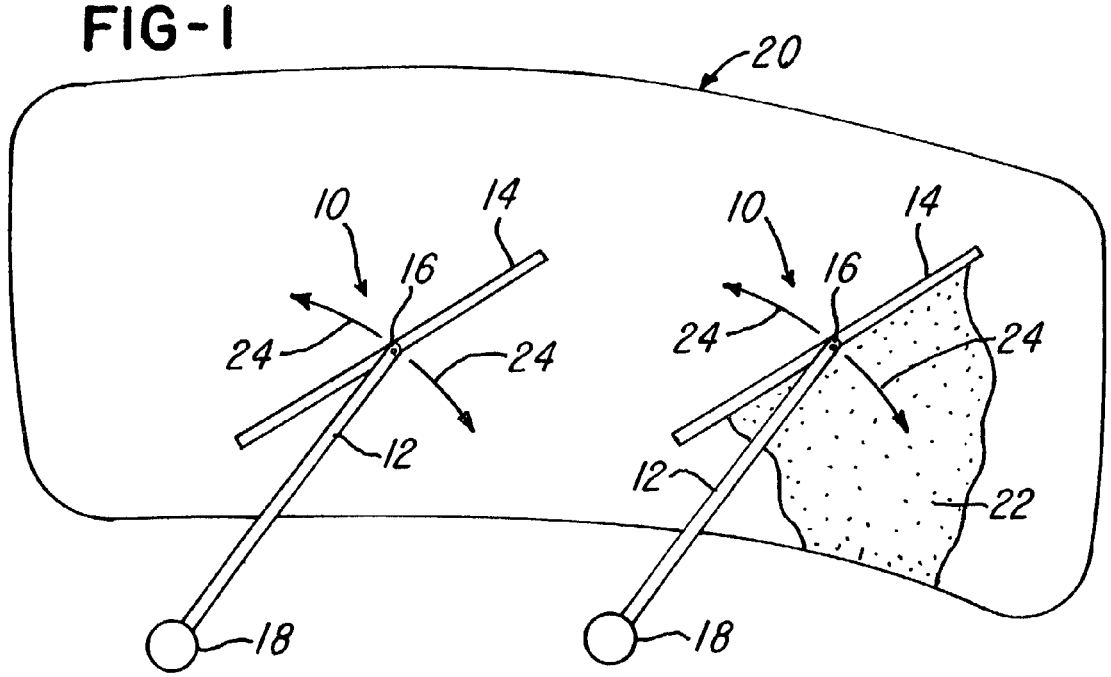
FIG. 1 is a sketch of two cooperatively installed windshield wiper systems, one of which is stalled by blockage material.

Referring now to FIG. 1, there are illustrated two windshield wiper systems, 10, 10, each of which has a wiper 14, connected to a flexible drive arm 12 at a pivotal joint 16. Wipers 14, 14 each comprise a wiper blade (not illustrated), suitably supported by its associated pivotal joint 16. For this purpose, the wipers 14, 14 may be fitted with spines (also not illustrated) assembled in well known whiffletree or flat blade arrangements. A pair of drive motors 18, 18 cause flexible drive arms 12, 12 to carry wipers 14, 14 across windshield 20 in reversing arc-like paths 24, 24, so as to remove debris therefrom. For ease of illustration, the motors 18, 18 are shown coupled to the arms 12, 12, but it should be understood that drive linkage (not shown) may be employed to couple the arms 12, 12 to a single motor 18 or multiple motors 18, 18.

Still referring again to FIG. 1, the flexible drive arm 12 on the right hand side of the windshield 20 is shown to be working against a relatively unyielding pack 22 of foreign matter or debris. This produces a relatively high stress which tends to be transferred to the associated motor 18. In accordance with this invention, wear and tear on the motor is reduced by twisting the flexible drive arm to reduce the stiffness thereof and sharply achieve elastic buckling upon occurrence of the predetermined bending force. The principal structural component of a flexible drive arm 12 is a hollow tube 32, manufactured from a composite material, as hereinafter described. It should also be understood that the arm 12 may be solid as shown in the embodiment illustrated in FIGS. 33–39.

The geometry of a tube 32 is illustrated in FIG. 2. Preferably, tube 32 is fitted with an elastomeric hose 47, as shown in cross-section in FIG. 3. Tube 32 is characterized by a cross-section having an off-center shear center 37. Tube 32 is secured to motor axis 26 by a stamping or casting (not illustrated) and extends from motor axis 26 to a wiper axis 28 in an initial direction indicated by a longitudinal axis 30 as illustrated in FIG. 2. Wiper 14 is attached to tube 32 along wiper axis 28. Wiping loads are transferred from wiper 14 to tube 32 along that axis. As further shown in FIG. 2, tube 32 has a pronounced sideward curvature which carries it laterally away from longitudinal axis 30. The total amount of this curvature is indicated on FIG. 2 by the angle α. That is the non-stressed, rest configuration of tube 32, where no bending force is transmitted from wiper 14 to tube 32. When the arm 12 is installed in operative relationship to a windshield, the arm 12 flattens and reduces the moment of inertia in the "out-of-plane" bending. The arm 12 experiences lateral bending load as the arm 12 sweeps across the windshield 20.

In the rest condition shown in FIG. 2, wiper 14 rests lightly against the curving contour of the windshield 20. However, when wiper 14 traverses a substantially planar windshield region, the windshield 20 reacts against wiper 14, thereby creating a bending force, which is transmitted along wiper axis 28 to tube 32. That produces a bending force, F, which stresses tube 32, causing flexible drive arm 12 to straighten out in the direction of longitudinal axis 30. The bending force acting in the plane of the angle may be calculated from the following equation:

$$\text{where: } K = \frac{3EI}{L^3} \quad F = \frac{3EI\delta}{L^3} = KS$$

where: k is the spring constant of the flexible drive arm
E is the modulus of elasticity of the flexible drive arm
I is the moment of inertia about the major axis
δ is the deflection in the direction of the major axis
L is the length of the flexible drive arm.

Figure 32:
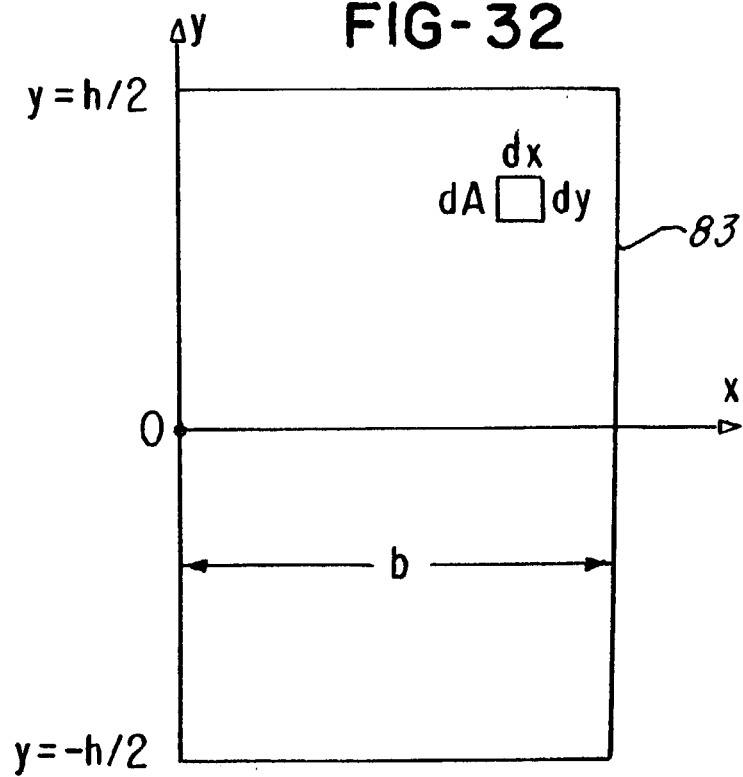
FIG. 32 is a view illustrating various directional components for facilitating an understanding of the Moment of Inertia to be calculated as described.

The value of the moment of inertia depends upon the position and the direction of a reference axis about which the moment of inertia is calculated. For example, FIG. 32 depicts a rectangular cross-section 83 having a height h and a base b. Assume that this rectangular cross-section is made up of elemental areas, dA, having directional components dX and dY and that the Moment of Inertia, $I_x$, is to be calculated about the x-axis. The value of $I_x$ is given by the equation;

$$I_x = \int y^2 dA$$

which can be expanded to:

$$I_x = \int_{-\frac{h}{2}}^{\frac{h}{2}} y^2 \left[ \int_o^b dx \right] dy$$

or $$I_x = b \int_{-\frac{h}{2}}^{\frac{h}{2}} y^2 dy$$

This gives:

$$I_x = \frac{b}{3} y^3 \Big|_{-\frac{h}{2}}^{\frac{h}{2}} = \frac{b}{3}[(h/2)^3 - (-h/2)^3]$$
$$= \frac{b}{3}\left[\frac{h^3}{8} + \frac{h^3}{8}\right] = \frac{bh^3}{12}$$

Consequently, flexible drive arm 12 is sufficiently stiff to carry a bending force which varies in proportion to the minor axis length. As flexible drive arm 12 bends toward longitudinal axis 30, tube 32 generates a shear flow causing a bending stress that flattens tube 32 about its shear center 37. The twist angle, so produced, is indicated by the Greek letter β in FIG. 5. Twisting of tube 32 tends to flatten out the cross-section thereof, as illustrated in FIGS. 22–28, which in turn causes a substantial reduction in the moment of inertia, I. This reduces the stiffness of tube 32, as well as the force calculated by the above noted equation, so that elastic buckling occurs rapidly upon occurrence of the predetermined force. It will be understood that the location of shear center 37 is shown only approximately. The actual position is situated at a point such that a hypothetical shear load, equivalent to the actual distributed shear load, would produce a twist, β, when directed therethrough. Most preferably, the cross-section varies along the length of tube 30.

In the embodiment described, the arm 12 comprises a slenderness ratio, L/r of at least 50, but not more than 600,
where: L is the length of the arm 12; and
"r" is the least radius of gyration of the cross-section ($I = ar^2$), where I is the moment of Inertia and a is the area of the cross-section.

In prior art wiping systems of the cantilever beam type the drive arm is oftentimes shaped such that aerodynamic wind forces of increasing speed tend to press the arm into the glass with lower intensity. Also, with such prior art systems the arm tip force normally increases at the tip as the beam is deflected. The present invention compensates for such increases by providing a beam cross-section having a moment of inertia affording a substantially constant tip force through the working deflection. In the preferred embodiment, flexible drive arm 12 has an off-center shear center 37 which reduces arm twisting due to torsional loads about wiper axis 28. In one preferred embodiment the off-center shear center may appear as a 'smile' or upwardly curved (as viewed in FIG. 2) cross-section (See FIGS. 3–5). The material has high elongation properties and will allow for major deformation without breaking. A frozen blade might twist the structure and the arm flex out of plane, breaking loose the ice.

In a typical prior art wiping system the arm would deflect 0–3 inches or 75 mm. The deflection is caused by the rise and fall of the arm during the wiping action. In some cases there is no elastic buckling. Another embodiment is where the arm 12 is a one piece solid or tubular construction that is generally U-shaped in cross-section. This cross-sectional shape is similar to a cross-sectional shape of a steel carpenter's rule. This embodiment produces the desired elastic buckling.

Figure 3:
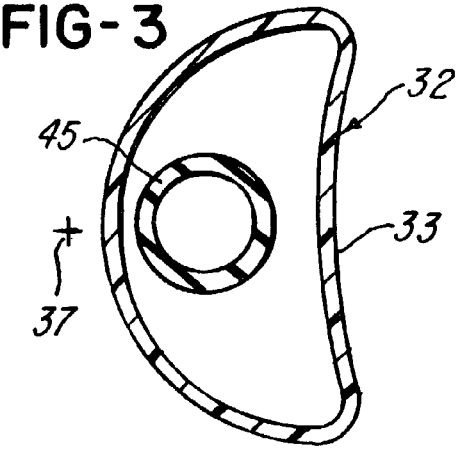
FIG. 3 is a drawing of a cross-section of a first embodiment of a flexible drive arm, taken at a lightly stressed station thereof.
Figure 5:
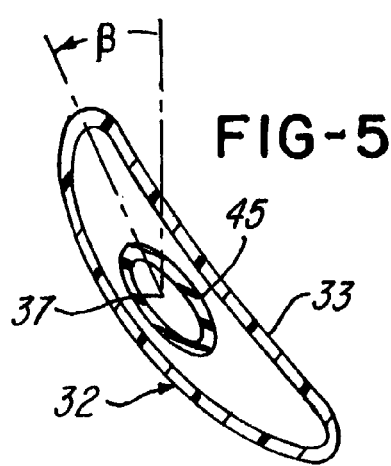
FIG. 5 is a drawing of a cross-section of the flexible drive arm embodiment of FIG. 3, taken at a heavily stressed station thereof.

The drawing of FIG. 2 includes a series of lines representing spaced stations along a flexible drive arm 12. FIGS. 3 and 5 illustrate the cross-sections thereof appearing at stations 32 and 34 respectively. These cross-sections decrease in scale and also flatten down as flexible drive arm 12 approaches station 32 from the direction of motor axis 26. This cross-sectional flattening is quite reminiscent of the snapping action of a sidewardly bowed steel rule when extended beyond a certain critical length and is due in part to the relative lengths of minor axis 83 and major axis 85.

Figure 4:
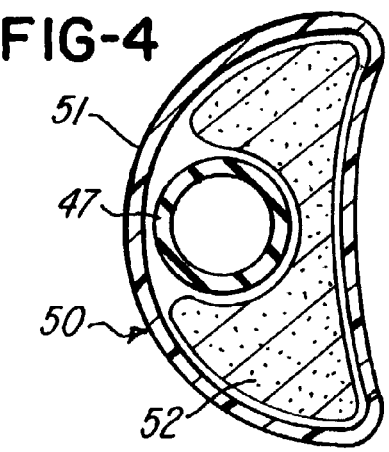
FIG. 4 is a drawing of a cross-section of a second embodiment of a flexible drive arm.

As illustrated in FIGS. 3 and 5, a flexible drive arm 12 may comprise a thin elastomeric hose 45 encased within a glass/fiber composite tube 33. Hose 45 provides a passage for supplying washer fluid to the wiping blade (not illustrated). More preferably, however, a flexible drive arm 12 has a configuration 50, as illustrated in FIG. 4. This particular embodiment features a fluid supply hose 47 encased within a tube 51 and supported by a foam core 52. Preferably, drive arms 12, 12 are manufactured from a fiber-reinforced plastic material, produced by a well known process called "pull-molding". Broad background teachings regarding pull-molding may be found by reference to U.S. Pat. No. 6,253,411 B1 (Aichele et al.), the disclosure of which is hereby incorporated herein. This invention generally follows prior art teachings, such may be found in the patent produces a pull-molded strand of glass/plastic composite. It should be understood that the strands may be glass, carbon or other suitable fiber. That strand (not illustrated herein) is stored on a suitable reel until required. At that time a large batch of flexible drive arms may be produced in a joined, end-to-end, arrangement, withdrawing pull-molded composite material from the reeled strand, as required. Individual drive arms 12 may be sawed off from the linked arrangements at such time as may be convenient. It has been found particularly convenient to store the still-joined flexible drive arms on a large reel and to separate them just prior to shipment from the factory. It will be appreciated that the entire process could be consolidated at a single site, but it is feasible to parcel out parts thereof to separate contractors.

FIGS. 33–39 illustrate another embodiment of the invention. Notice the arm 13 is a solid uniaxial pull-molded wiper arm with diecast terminations 61 and 62 which are crimped onto the ends thereof as shown. It should be appreciated that the end or fitting 61 comprises an opening 63 for mounting onto a drive motor 18 (FIG. 1). The fitting 62 may be a shaft or post for receiving a wiper blade 14 (FIG. 1). In the embodiment being described, the post 62 may be situated in an opening 65 and then riveted onto the drive arm 13. In the embodiment being described, this arm 13 is a right hand wiper arm which would be situated on the right hand wiper motor 18 (as viewed in FIG. 1). Note the cross-sectional transitions (FIGS. 34–39) of the pull-molded wiper arm 13.

The arm 13 comprises the following dimensions:

| Dimensions (FIGS. 33–39) | Measurement (mm) |
|---|---|
| $D_1$ | 3.71 |
| $D_2$ | 36.98 |
| $D_3$ | 3.89 |
| $D_4$ | 36.2 |
| $D_5$ | 6.13 |
| $D_6$ | 23.11 |
| $D_7$ | 7.78 |
| $D_8$ | 18.24 |
| $D_9$ | 8.2 |
| $D_{10}$ | 17.13 |
| $D_{11}$ | 12.53 |
| $D_{12}$ | 10.54 |
| $D_{13}$ | 55 |
| $D_{14}$ | 615 |
| $D_{15}$ | 640 |
| $D_{16}$ | 150 |
| $D_{17}$ | 110 |
| $D_{18}$ | 50 |
| $D_{19}$ | 240 |

It should be appreciated that the arm 13 may be of solid construction with fiber orientation, for example, the longitudinal direction of the arm 13. The arm 13 may comprise one or more of the features described earlier herein relative to the other. embodiments, such as a channel or tube through which wiper fluid may flow and the like.

Advantageously, the invention provides a lightweight, yet strong, drive arm having a relatively low modulus of elasticity and a relatively high elongation factor. Another advantage of the invention is that the flexible arm twists in the presence of a compressive load and undergoes rapidly progressing elastic buckling when the compressive load exceeds a predetermined amount such as when the wiper blade 14 (FIG. 1) encounters debris on the windshield and the drive arm 12,13, experiences a bending force that is greater than the maximum blade frictional force. The simple one-piece construction and elasticity of the drive arm 12, 13 provides a lightweight, yet strong, drive arm that facilitates using fewer number of components and parts which can become unusable if overfatigued.

In the preferred embodiment the overall process for making a flexible drive arm includes the steps of:
1. Preparing a mold having an internal cavity characterized by spaced cross-sections of generally one of the configurations shown in FIGS. 1–39.
2. If desired, placing a tube in the cavity to provide a pathway through drive arm 12, 13.
3. Placing flexible filler material inside the cavity to support the hose and to provide a form for building the flexible drive arm 12 or 13.
4. Foam cores are formed, for example, by inflating tube 51 (FIG. 31) to press foam against mold walls 53a and 53b (FIG. 31).
5. The successive cores are placed on a shipping roll (not shown) for transport.
6. Fiber (glass, carbon, etcetera) is woven over each core as described herein.
7. Woven cores are places on shipping roll (not shown) for transport.
8. Shipping roll of woven, end-to-end cores are unrolled from roll.
9. Woven cores are subject to resin bath to provide resin-coated core.
10. Resin-coated core placed in mold.
11. Mold heats and cures resin-coated core.
12. Cured cores removed from molds.
13. Successive cores are cut apart.
14. End fittings are crimped onto ends of core to provide drive arm 12.
15. Plastic or other material (not shown) may be optionally over-molded over joints (not shown) between fittings and drive arm 12.

Braiding of the pull-molded strand proceeds as illustrated in FIG. 6. During braiding, a plurality of strips of pull-molded working material are fed to an automatic braiding machine which braids them into tubes having a generally crescent-shaped cross-section. At some locations along flexible drive arms 12, 12, the cross-sections may resemble the familiar "smiley face" commonly appearing on the contemporary American scene. Alternatively, they may be elliptical, or even concave on one side with the opposing side being generally flat. The braiding machine creates a triaxial braid at a braiding angle, $\gamma$, which varies along the length of the arm. This optimizes torsional stability and provides a reduced stiffness perpendicular to the fibers, thereby minimizing arm pressure variance as the arm tip rises and falls during the wiping of the windshield glass.

The tube walls comprise about twenty-one percent by weight of a thermosetting polyester resin, seventy-five percent by weight of 113E-Glass Roving and four percent by weight of a suitable filler. It should be appreciated that the percentages may vary from those mentioned, which are presented for purposes of illustration only. In its unbraided state the working material has the following preferred monotonic properties:

Elastic Modulus 43 GPa (6.2 Mpsi)
Ultimate strength of 11400 Mpa (165 ksi);
Strain at fracture=2.6%,
Specific Gravity=1.92

This composite material may be strained about 10 times as much as spring steel and is able to withstand a relatively large deflection without fracture. It is important that the ends of flexible drive arms 12, 12 be properly terminated in order to deal with high stress concentrations applied along motor axis 26 and wiper axis 28. Bolt holes in the braided material along motor axis 26 and wiper axis 28 would fray and eventually fail, if made to carry the stress of ordinary nut and bolt attachments. Therefore this invention joins drive arms 12,12 to other parts by means of thermoplastic or thermoset overmolded, ductile steel, aluminum, zinc or other metallic die cast stampings. A part to be joined to a drive arm 12 is formed around and inside the pull-molded arm. Since the space between the steel stamping and the fiberglass structure is small, any "Plastic Creep" effect is minimal, and the stress is transferred effectively between parts.

The braid illustrated in FIG. 6 is a structure similar to the weave of a sock or a Chinese torture finger tube, only woven and placed continuously on a reel, perhaps over a foam core. It should be understood that the braid could be straight in a longitudinal direction along its length or even straight in a vertical direction (as viewed in FIG. 6) or any combination thereof.

Figure 30:
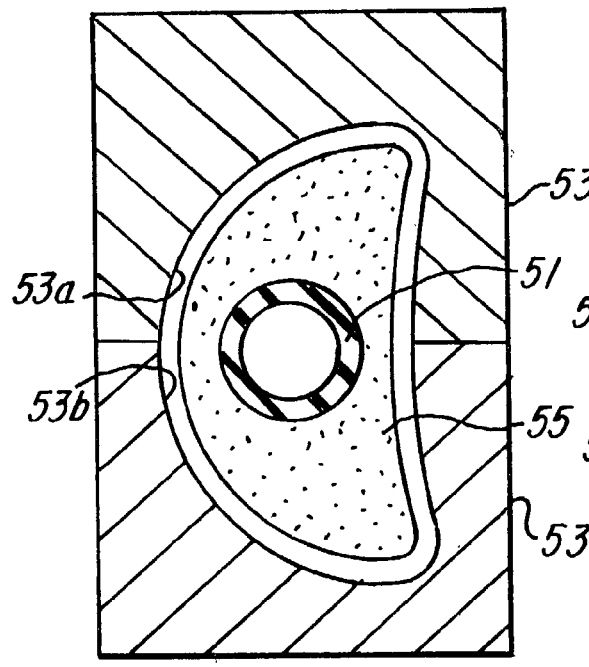
FIG. 30 is a view illustrating a tube in a mold prior to inflation or enlargement.
Figure 31:
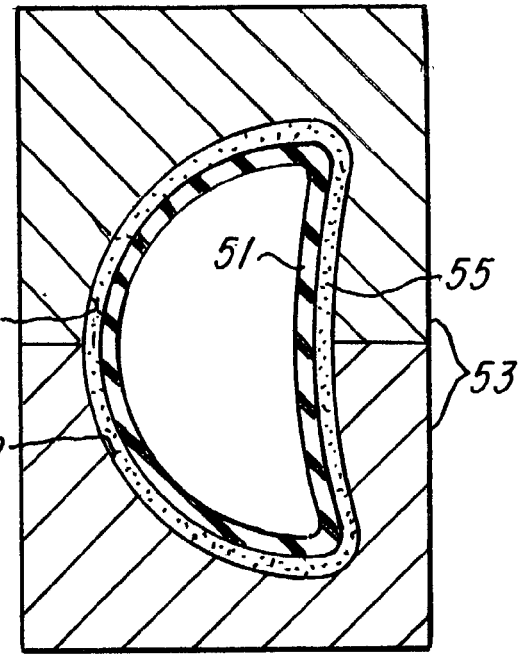
FIG. 31 is a view similar to FIG. 30 where the tube has been inflated to mold the material to a shape which will define the drive arm.

Note in FIG. 30 that the drive arm 12 could also be formed by alternative methods. For example, an elastometric tube 51 may be placed in a mold 53. Foam 55 or other suitable forming material is situated around tube 51, as illustrated in FIG. 30. The tube 51 is then expanded by gas, such as air or water against walls 53a and 53b of mold 53 (as shown in FIG. 31) to provide an arm 12. The arm 12 may then be processed with one or more of the steps 3–12 described earlier herein. It is envisioned that the tube 51 may then be deflated and subsequently used to provide a passageway or channel for washer fluid through the arm 12.

FIGS. 7–24 illustrate further features of an embodiment of the invention having the characteristics described.

FIG. 7 illustrates a plan or top view of the composite wiper arm as described earlier herein relative to FIG. 2. Note the generally curved shape illustrated in FIG. 8 which facilitates providing the aforementioned tip force which facilitates maintaining the wipers 14 against the windshield 15. FIGS. 9–12 illustrate various cross-sectional views of the arm in an embodiment of the invention when the arm is at rest. These shapes are further illustrated in FIGS. 13–17.

Figure 13:
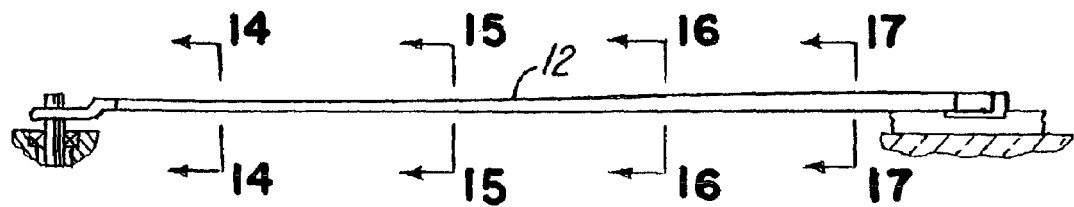
FIG. 13 is a view of the drive arm having one end mounted to a shaft of a motor, with the second end having a wiper blade mounted thereon and in operative engagement with a windshield.
Figure 14:
FIG. 14 is a cross-sectional view taken along the line 14—14 in FIG. 13.
Figure 15:
FIG. 15 is a cross-sectional view taken along the line 15—15 in FIG. 13.
Figure 16:
FIG. 16 is a cross-sectional view taken along the line 16—16 in FIG. 13.

FIGS. 18–24 illustrate a general change in the cross-sectional shape when the wipers engage the debris 22 (FIGS. 1 and 13). FIGS. 14–16 illustrate the cross-sectional shape of the arm 12 when it first engages the debris 22.

Figure 17:
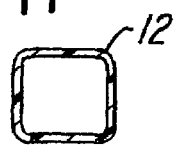
FIG. 17 is a cross-sectional view taken along the line 17—17 in FIG. 13.
Figure 18:
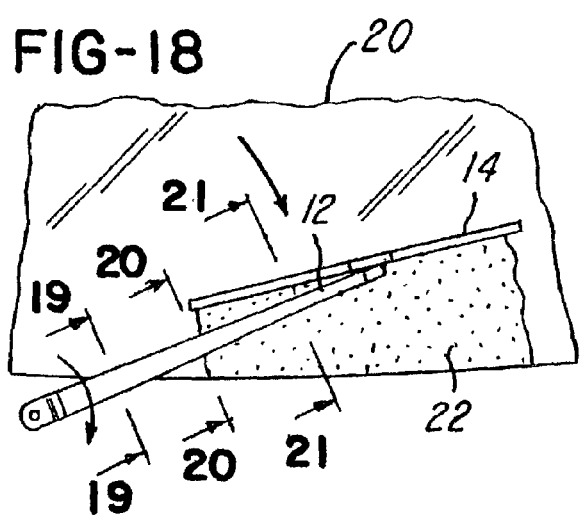
FIG. 18 is another view of the drive arm as it engages debris on a windshield.
Figure 19:
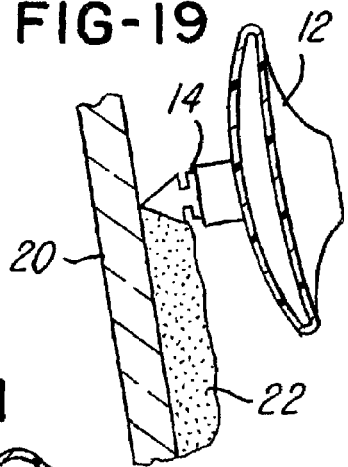
FIG. 19 is a sectional view taken along the line 19—19 in FIG. 18.
Figure 20:
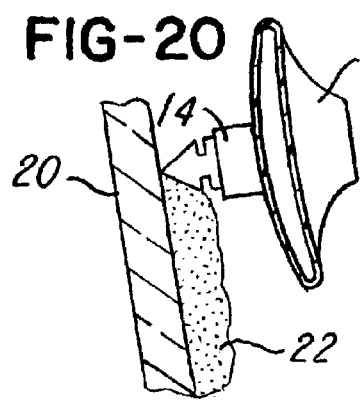
FIG. 20 is a cross-sectional view taken along the line 20—20 in FIG. 18.
Figure 21:
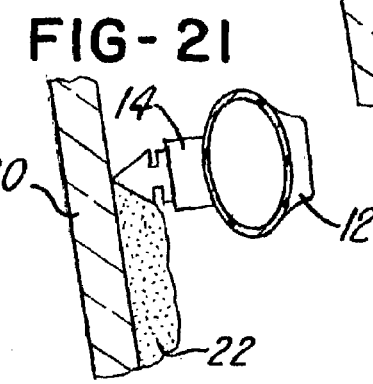
FIG. 21 is cross-sectional view taken along the line 21—21 in FIG. 18.

As the motor 18 (FIG. 17) continues to drive the arm 12 in the direction of arrow A in FIG. 17, the arm experiences increased torque and begins to twist in the manner illustrated and described herein. Note that the leading edge 12a begins to move toward the debris 22 as shown and the trailing edge moves away from the windshield as illustrated in FIG. 18. This slight twist and movement of the arm is also experienced at the cross-sectional areas illustrated in FIG. 19 and 20.

FIG. 22 illustrates a more exaggerated twisting motion as the motor 18 continues to attempt to drive the arm 14 in the direction of arrow A. Further twisting of the arm is illustrated and FIGS. 22–24 further show the movement of the leading and trailing edges 12a and 12b, respectively. It is important to note, as illustrated in FIGS. 22 and 23 and described earlier herein, that the cross-sectional shape of the arm changes from the generally curved shape shown, for example, in FIGS. 18 and 19, to a generally flatter shape illustrated in FIGS. 22 and 23. This feature of the invention facilitates distributing the encountered load forces and torque across the length of the arm 12 which in turn facilitates accommodating the elastic buckling which would normally severely damage the wiper arms used in the past.

While the systems and methods herein described, and the forms of apparatus for carrying these systems and methods into effect, constitute one embodiment of this invention, it is to be understood that the invention is not limited to these precise methods and forms of apparatus, and that changes may be made in either without departing from the scope of the invention, which is defined in the appended claims.

What is claimed is:

1. A drive arm for a windshield wiper comprising:
a tubular member having a preselected cross-section and an internal cavity extending along a longitudinal axis, with a curvature extending laterally from said longitudinal axis, said tubular member having at least a portion along its longitudinal axis that defines a generally crescent-shaped cross-section;
said internal cavity defining a passageway through which washer fluid may pass;
said tubular member defining a wiper axis for connection of a wiper thereto and also defining a motor axis for connection of a drive motor thereto; and
said tubular member generally bending about said longitudinal axis when a bending force is applied thereto.

2. The drive arm according to claim 1 further comprising an elastomeric hose extending end-to-end through said internal cavity for providing said passageway.

3. The drive arm according to claim 2 wherein said tubular member experiences elastic buckling when said bending force exceeds a predetermined amount.

4. The drive arm according to claim 2 wherein said wiper axis being positioned to cause a bending of said tubular member in a manner which opposes said bending force.

5. The drive arm according to claim 2 wherein said preselected cross-section having an off-center shear center.

6. The drive arm according to claim 2 wherein said tubular member experiences elastic buckling when said bending force exceeds a predetermined amount.

7. The drive arm according to claim 2 wherein said wiper axis is positioned to cause a bending of said tubular member in a manner which opposes said bending force.

8. The drive arm according to claim 2 wherein said preselected cross-section has an off-center shear center.

9. The drive arm according to claim 2, wherein said tubular member flattens such that at least a portion of said preselected cross-section is generally flat.

10. The drive arm according to claim 2 wherein said preselected cross-section is elliptical.

11. The drive arm according to claim 1, wherein said preselected cross-section is elliptical.

12. The drive arm as recited in claim 1, wherein said tubular member is generally curved in cross-section and said generally curved cross-section defines a shape that is elliptical, concave or one side of said arm is generally flat.

13. The drive arm as recited in claim 1, wherein said tubular member is generally curved in cross-section and said generally curved cross-section defines a width that generally increases when a wiper blade encounters debris on a windshield and said drive arm experiences a bending force that is greater than a predetermined force.

14. The drive arm recited in claim 13 wherein said predetermined force is greater than the blade maximum frictional force.

15. The drive arm as recited in claim 1 wherein said tubular member is generally curved in cross-section and a leading edge of said generally curved cross-section moves towards a windshield and a trailing edge of said generally curved cross-section moves away from said windshield when a wiper blade encounters debris on said windshield and said drive arm experiences a bending force that is greater than a predetermined force.

16. The drive arm as recited in claim 1 wherein said bending force is greater than a blade maximum frictional force.

17. The drive arm as recited in claim 1 wherein said tubular member twists when a wiper blade encounters debris on a windshield and said drive arm experiences a bending force that is greater than a predetermined force.

18. A drive arm for a windshield wiper comprising:
a tubular member having a preselected cross-section and an internal cavity extending along a longitudinal axis, with a curvature extending laterally from said longitudinal axis, said tubular member having a cross-sectional shape and associated dimension one of which changes along the longitudinal axis;
said internal cavity defining a passageway through which washer fluid may pass; said tubular member defining a wiper axis for connection of a wiper thereto and also defining a motor axis for connection of a drive motor thereto;

said tubular member generally bending about said longitudinal axis when a bending force is applied thereto;

wherein said drive arm comprises an elastomeric hose extending end-to-end through said internal cavity for providing said passageway;

wherein said preselected cross-section has an off-center shear center; and said tubular member comprises a crescent-shaped cross-section being straightened out such that at least a portion of said crescent-shaped cross-section flattens out.

19. A drive arm for a windshield wiper comprising:

a tubular member having a preselected cross-section and an internal cavity extending along a longitudinal axis, with a curvature extending laterally from said longitudinal axis, said tubular member having a cross-sectional shape and associated dimension one of which changes along said longitudinal axis;

said internal cavity defining a passageway through which washer fluid may pass;

said tubular member defining a wiper axis for connection of a wiper thereto and also defining a motor axis for connection of a drive motor thereto;

said tubular member generally bending about said longitudinal axis when a bending force is applied thereto; and said drive arm further comprising a foam core fitted within said internal cavity.

20. A drive arm for a windshield wiper comprising:

a tubular member having a preselected cross-section and an internal cavity extending along a longitudinal axis, with a curvature extending laterally from said longitudinal axis, said tubular member having a cross-sectional shape and associated dimension one of which changes along the longitudinal axis;

said internal cavity defining a passageway through which washer fluid may pass;

said tubular member defining a wiper axis for connection of a wiper thereto and also defining a motor axis for connection of a drive motor thereto;

said tubular member generally bending about said longitudinal axis when a bending force is applied thereto; and wherein said preselected cross-section is crescent-shaped.

21. A drive arm for a windshield wiper comprising:

a tubular member having a preselected cross-section and an internal cavity extending along a longitudinal axis, with a curvature extending laterally from said longitudinal axis, said tubular member having a cross-sectional shape and associated dimension one of which changes along the longitudinal axis;

said internal cavity defining a passageway through which washer fluid may pass;

said tubular member defining a wiper axis for connection of a wiper thereto and also defining a motor axis for connection of a drive motor thereto;

said tubular member generally bending about said longitudinal axis when a bending force is applied thereto;

wherein said drive arm further comprises an elastromeric hose extending end-to-end through said internal cavity for providing said passageway;

wherein said tubular member being naturally curved in the absence of a bending force on said wiper axis;

wherein said drive arm further comprises an elastomeric hose extending end-to-end when said bending force exceeds a predetermined amount;

wherein said tubular member flattens such that at least a portion of said cross-sectional shape is generally flat; and wherein said drive arm further comprises a foam core fitted within said internal cavity.

22. A drive arm for a windshield wiper comprising;

a tubular member having a preselected cross-section and an internal cavity extending along a longitudinal axis, with a curvature extending laterally from said longitudinal axis, said tubular member having a cross-sectional shape and associated dimension one of which changes along the longitudinal axis;

said internal cavity defining a passageway through which washer fluid may pass;

said tubular member defining a wiper axis for connection of a wiper thereto and also defining a motor axis for connection of a drive motor thereto;

said tubular member generally bending about said longitudinal axis when a bending force is applied thereto;

wherein said drive arm further comprises an elastomeric hose extending end-to-end through said internal cavity for providing said passageway;

wherein said tubular member being naturally curved in the absence of a bending force on said wiper axis;

further comprising an elastomeric hose extending end-to-end through said internal cavity for providing said passageway; and wherein said preselected cross-section is crescent-shaped.

* * * * *